United States Patent
Yoo et al.

(10) Patent No.: US 10,740,604 B2
(45) Date of Patent: Aug. 11, 2020

(54) ELECTRONIC DEVICE FOR IRIS RECOGNITION AND OPERATING METHOD THEREOF

(71) Applicant: SAMSUNG ELECTRONICS CO., LTD., Suwon-si, Gyeonggi-do (KR)

(72) Inventors: Juwoan Yoo, Anyang-si (KR); Kwanghyun Lee, Yongin-si (KR); Heejun Lee, Seoul (KR); Alexei Fartukov, Moscow (RU); Gleb Odinokikh, Moscow (RU); Vitalii Gnatiuk, Moscow (RU); Vladimir Eremeev, Moscow (RU); Dae-Kyu Shin, Suwon-si (KR); Jeong-Min Park, Hwaseong-si (KR); Ji-Yoon Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 48 days.

(21) Appl. No.: 15/838,869

(22) Filed: Dec. 12, 2017

(65) Prior Publication Data
US 2018/0204058 A1    Jul. 19, 2018

(30) Foreign Application Priority Data
Jan. 17, 2017    (KR) .......................... 10-2017-0007960

(51) Int. Cl.
*G06K 9/00*    (2006.01)
*G06K 9/68*    (2006.01)

(52) U.S. Cl.
CPC ....... *G06K 9/00604* (2013.01); *G06K 9/0061* (2013.01); *G06K 9/00597* (2013.01);
(Continued)

(58) Field of Classification Search
CPC .............. G06K 9/0061; G06K 9/00617; G06K 9/00597
See application file for complete search history.

(56) References Cited

U.S. PATENT DOCUMENTS

| | | | |
|---|---|---|---|
| 6,505,193 B1* | 1/2003 | Musgrave | ............... G06F 21/32 |
| 8,630,464 B2* | 1/2014 | Whillock | ............. G06K 9/0061 |
| | | | 382/117 |

(Continued)

FOREIGN PATENT DOCUMENTS

| | | |
|---|---|---|
| EP | 1 457 926 | 9/2004 |
| EP | 2 528 015 | 11/2012 |

OTHER PUBLICATIONS

Extended Search Report dated Jun. 4, 2018 in counterpart European Patent Application No. EP18150346.7.
(Continued)

*Primary Examiner* — Santiago Garcia
(74) *Attorney, Agent, or Firm* — Nixon & Vanderyhe P.C.

(57) ABSTRACT

An electronic device for iris recognition and an operating method thereof are provided. The electronic device includes a housing including a first surface, a display exposed through a first region of the first surface, a light emitting unit comprising light emitting circuitry disposed in a second region of the first surface, an image device comprising image acquiring circuitry disposed in a third region of the first surface, at least one processor disposed within the housing and electrically connected with the display, the light emitting unit and the image device, and a memory disposed within the housing and electrically connected with the at least one processor. The memory stores instructions that, when executed by the processor, cause the electronic device to store a reference template based on a first iris image which has been recognized using the light emitting unit and the image device, to authenticate a second iris image which has
(Continued)

been recognized using the light emitting unit and the image device, using the stored reference template, and to store a template of the second iris image succeeded in authentication, as an additional template.

18 Claims, 19 Drawing Sheets

(52) U.S. Cl.
CPC ..... G06K 9/00617 (2013.01); G06K 9/00926 (2013.01); G06K 9/685 (2013.01)

(56) References Cited

U.S. PATENT DOCUMENTS

| | | | | |
|---|---|---|---|---|
| 10,089,525 | B1* | 10/2018 | Mayer | G06K 9/0061 |
| 2003/0218719 | A1* | 11/2003 | Abourizk | A61B 5/18 |
| | | | | 351/209 |
| 2015/0193926 | A1* | 7/2015 | Berlatzky | G01N 33/00 |
| | | | | 382/149 |
| 2015/0220931 | A1* | 8/2015 | Alsina | G06Q 20/12 |
| | | | | 705/44 |
| 2016/0012218 | A1* | 1/2016 | Perna | G06F 16/5838 |
| | | | | 726/18 |
| 2016/0171280 | A1* | 6/2016 | Han | G06K 9/00067 |
| | | | | 348/77 |
| 2016/0225212 | A1* | 8/2016 | Chou | G07C 9/00563 |
| 2016/0379093 | A1* | 12/2016 | Yoshioka | G06K 9/00255 |
| | | | | 382/159 |
| 2017/0069065 | A1* | 3/2017 | Lin | G06T 5/00 |
| 2017/0180614 | A1* | 6/2017 | Ollila | G06K 9/46 |
| 2017/0193276 | A1* | 7/2017 | Choi | G06K 9/00926 |
| 2017/0193723 | A1* | 7/2017 | Park | E05B 47/00 |
| 2017/0286790 | A1* | 10/2017 | Mapen | G06K 9/00926 |
| 2018/0103022 | A1* | 4/2018 | Tokunaga | B60R 25/24 |
| 2018/0268207 | A1* | 9/2018 | Kim | G06T 13/40 |

OTHER PUBLICATIONS

European Office Action dated May 22, 2019 for EP Application No. 18150346.7.

* cited by examiner

ELECTRONIC DEVICE FOR IRIS RECOGNITION AND OPERATING METHOD THEREOF

CROSS-REFERENCE TO RELATED APPLICATION

This application is based on and claims priority under 35 U.S.C. § 119 to a Korean Patent Application entitled "ELECTRONIC DEVICE FOR IRIS RECOGNITION AND OPERATING METHOD THEREOF" filed in the Korean Intellectual Property Office on Jan. 17, 2017 and assigned Serial No. "10-2017-0007960", the disclosure of which is incorporated by reference herein in its entirety.

BACKGROUND

1. Field

The present disclosure relates generally to an electronic device for iris recognition and an operating method thereof.

2. Description of Related Art

With the growth of information communication technologies, a variety of security systems are being required. For example, an automatic teller machine (ATM) of a bank needs a security system of identifying users who request asset management so as to strengthen security for users' assets. Even research institutes developing new technologies need a security system of identifying those who enter and leave.

To meet users' demands for security reinforcement of electronic devices, various security technologies are being developed. For example, the electronic devices can provide security technologies using various users' unique information capable of identifying users such as a user's fingerprint, voice, penmanship, iris and the like, as well as password numbers set by users.

When an electronic device identifies a user using the iris, the electronic device may analyze light reflected from the user's iris and identify the user based on a shape of the detected iris, a color thereof, etc. For example, by comparing a captured iris image with a previously registered reference iris image, the electronic device may recognize a specific user.

However, a pupil size may be changed according to an environmental condition (e.g., brightness) at iris recognition. For example, when a user is located in a bright space, the pupil size gets small and thus, the electronic device may capture an iris image whose similarity with the reference iris image is low. Accordingly, an iris recognition rate of the electronic device may be deteriorated.

SUMMARY

An electronic device according to various example embodiments of the present disclosure may include a housing including a first surface, a display exposed through a first region of the first surface, a light emitting unit comprising light emitting circuitry disposed in a second region of the first surface, an image device comprising image acquiring circuitry disposed in a third region of the first surface, at least one processor disposed within the housing and electrically connected with the display, the light emitting unit and the image device, and a memory disposed within the housing and electrically connected with the at least one processor, wherein the memory may store instructions that, when executed, by the processor cause the electronic device to store a reference template based on a first iris image which has been recognized using the light emitting unit and the image device, to authenticate a second iris image which has been recognized using the light emitting unit and the image device, using the stored reference template, and to store a template of the second iris image succeeded in authentication, as an additional template.

An operating method of an electronic device according to various example embodiments of the present disclosure may include storing a reference template based on a first iris image, authenticating a second iris image using the stored reference template, and storing a template of the second iris image succeeded in authentication, as an additional template.

A computer-readable recording medium according to various example embodiments of the present disclosure may store a program for executing storing a reference template based on a first iris image, authenticating a second iris image using the stored reference template, and storing a template of the second iris image succeeded in authentication, as an additional template.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
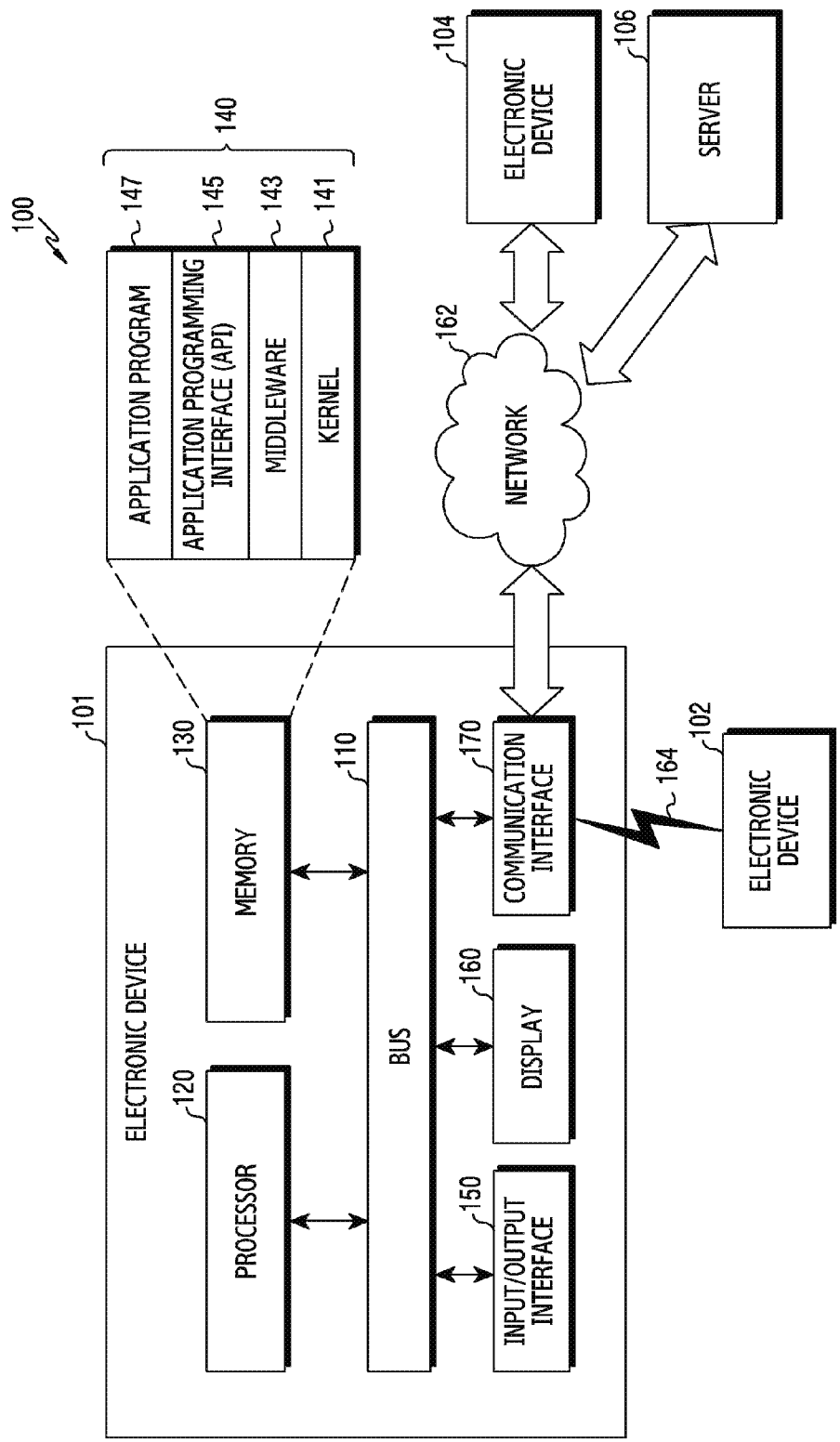
FIG. 1 is a diagram illustrating an electronic device within a network environment according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an example electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include various processing circuitry, such as, for example, and without limitation, one or more of a dedicated processor, a Central Processing Unit (CPU), an Application Processor (AP), and a Communication Processor (CP), or the like. The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150 may include various input/output circuitry and, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170 may include various communication circuitry and, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
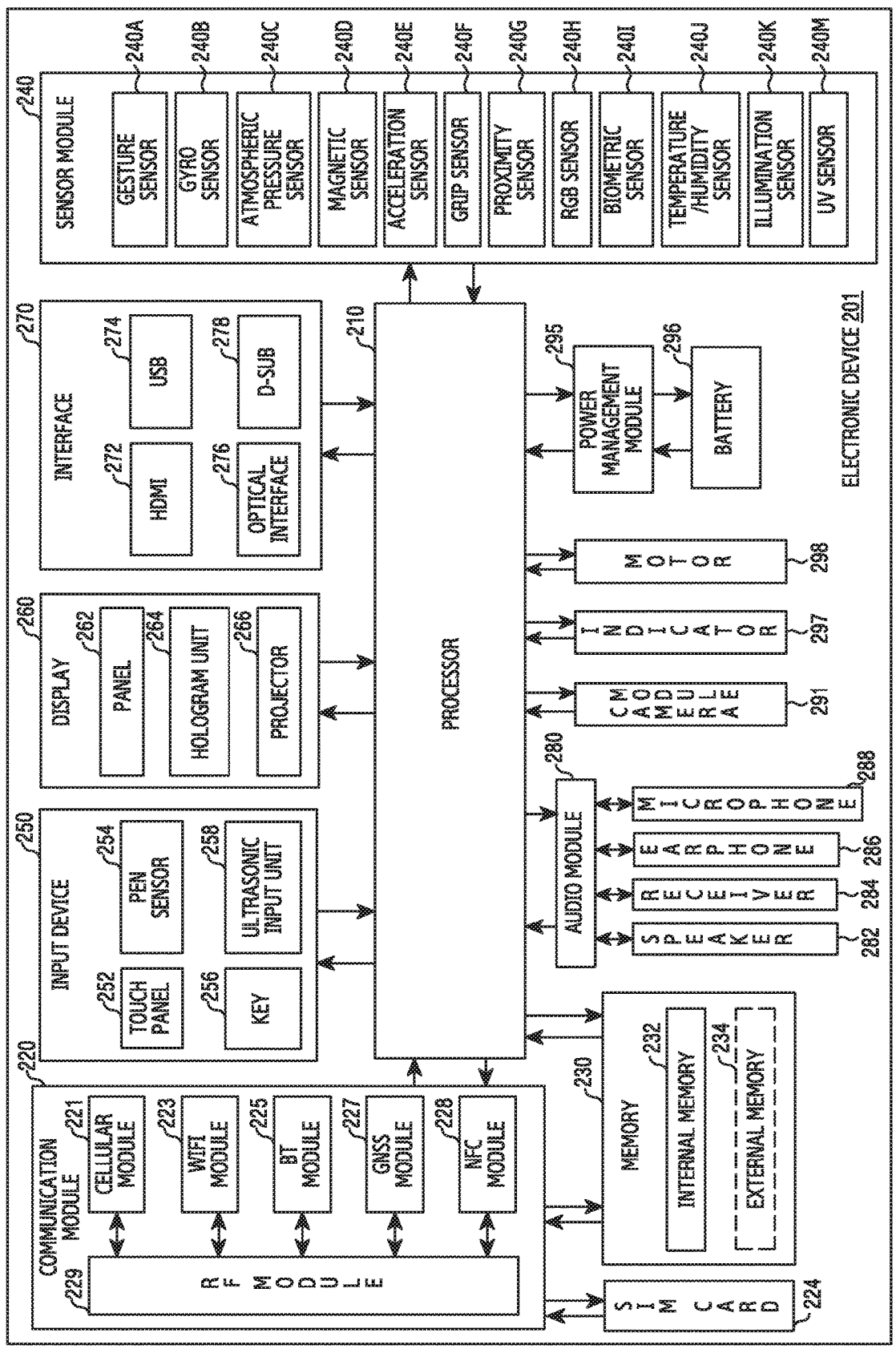
FIG. 2 is a block diagram illustrating an example electronic device according to various example embodiments.

FIG. 2 is a block diagram illustrating an example electronic device according to various example embodiments of the present disclosure.

FIG. 2 is a block diagram of an electronic device 201 according to various embodiments. For example, the electronic device 201 may include the whole or part of the electronic device 101 illustrated in FIG. 1. The electronic device 201 may include at least one processor (e.g., including processing circuitry) (e.g., Application Processor (AP)) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor (not shown). The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may include various communication circuitry, such as, for example, and without limitation, at least one or more of the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna.

In an embodiment, the RF module 229 may further include a plurality of matching circuits, sensors, and the like.

According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a biometric sensor 240I, a temperature/humidity sensor 240J, a light (e.g., illumination) sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
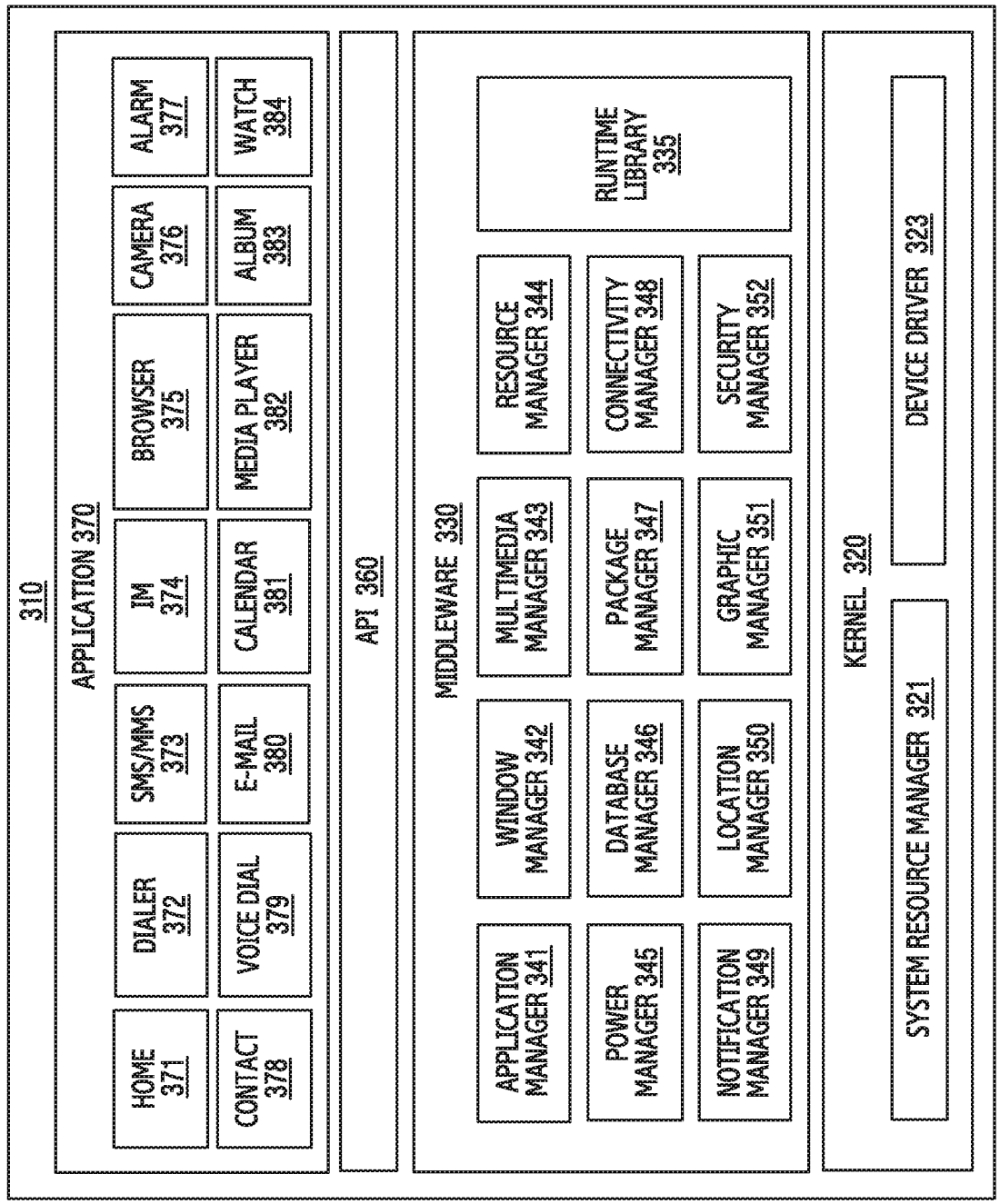
FIG. 3 is a block diagram illustrating an example program module according to various example embodiments.

FIG. 3 is a block diagram illustrating an example program module according to various example embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, and without limitation, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contact 378, voice dialer 379, email 380, calendar 381, media player 382, album 383, clock (e.g., watch) 384, or the like. Additionally, or alternatively, though not shown, the applications may include various applications, including, for example, and without limitation, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic device (e.g., the electronic device 101) and an external electronic device (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic device (e.g., the server 106, or the electronic device 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include, for example, and without limitation, at least one of a dedicated processor, a CPU, an Application-Specific Integrated Circuit (ASIC) chip, a Field-Programmable Gate Arrays (FPGA), and a programmable-logic device for performing operations, or the like, which has been known or are to be developed hereinafter.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present disclosure are intended for the explanation and understanding of the technical matter, and shall not limit the scope of the technology described in the present disclosure. Accordingly, the scope of the present disclosure should be understood to encompass all modifications or various other embodiments based on the technical concept of the present disclosure.

In addition, the various example embodiments disclosed in the present disclosure are intended for the explanation and understanding of the disclosed technical matter, and shall not limit the scope of various example embodiments of the present disclosure. Therefore, the scope of various embodiments of the present disclosure should be understood to encompass all modifications or various other embodiments based on the technical concept of the various embodiments of the present disclosure.

Figure 4A:
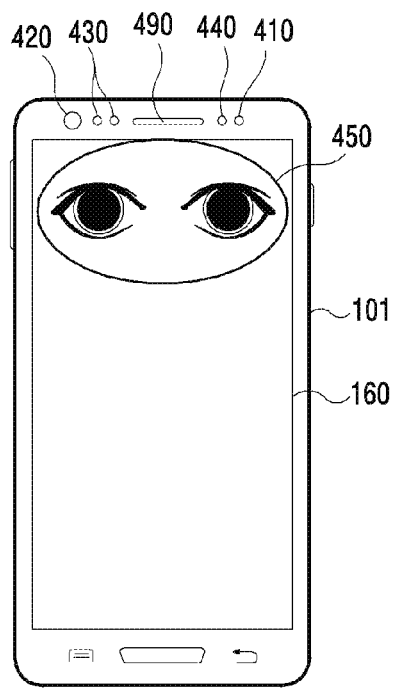
FIG. 4A and FIG. 4B are diagrams illustrating an example electronic device including elements for acquiring a template of an iris image according to an example embodiment of the present disclosure.
Figure 4B:
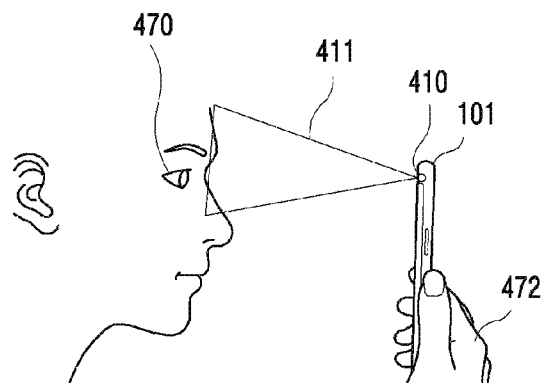
Figure 5:
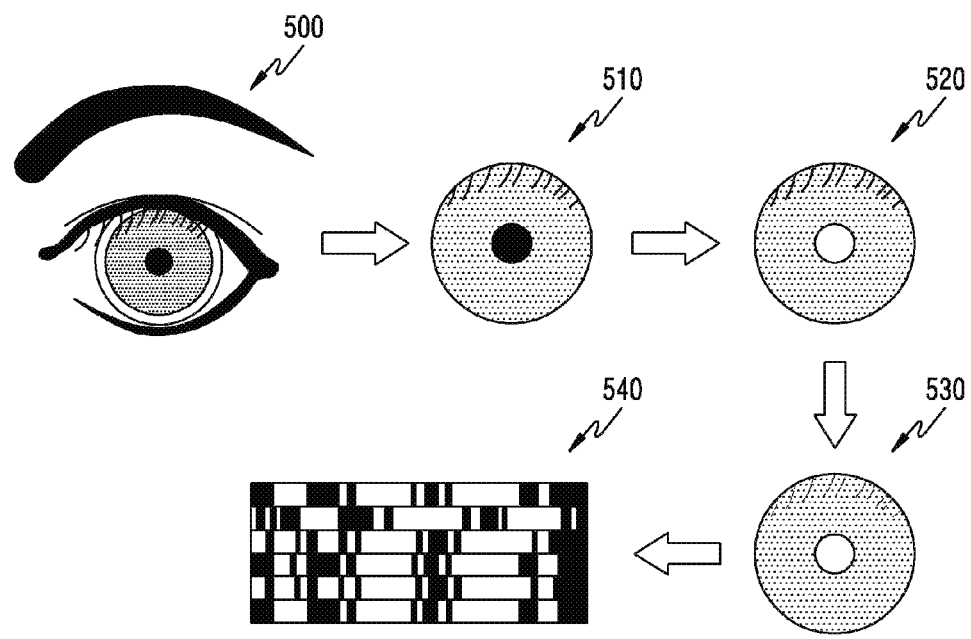
FIG. 5 is a diagram illustrating an example operation of acquiring a template of an iris image according to an example embodiment.

FIG. 4A and FIG. 4B are diagrams illustrating an example electronic device including elements for acquiring an iris image according to an example embodiment of the present disclosure. FIG. 5 is a diagram illustrating an example operation of acquiring a template of the iris image according to an example embodiment of the present disclosure.

Referring to FIG. 4A, FIG. 4B and FIG. 5, the electronic device according to an example embodiment may include the whole or part (e.g., the processor 102) of the electronic device 101 illustrated in FIG. 1.

According to various example embodiments, as illustrated in FIG. 4A, the electronic device 101 may include an iris camera 410 and a light source module (e.g., including light emitting elements and/or circuitry) 420. According to an example embodiment, the iris camera 410 and the light source module 420 may be disposed spaced apart from each other by a distance of a designated range within the electronic device 101. For example, the iris camera 410 and the light source module 420 may be disposed in opposite positions with a criterion of the center of a receiver 490 (or speaker) disposed in the middle of a top end of the electronic device 101. According to an example embodiment, the light source module 420 may include various light emitting elements and/or circuitry, such as, for example, and without limitation, at least one of an infrared light emitting diode (LED) and an infrared laser diode (LD), or the like.

According to various example embodiments, the electronic device 101 may acquire at least one iris image and store the same as a reference template (e.g., a reference iris template). The reference template may be reference information that is used for iris authentication. When a template of an iris image input for authentication is matched with the reference template, the electronic device 101 may authenticate a user. According to an example embodiment, the electronic device 101 may shoot user's eyes using the iris camera 410 and the light source module 420, thereby acquiring an iris image that will be used as the reference template. For example, as illustrated in FIG. 4B, in a state where the electronic device 101 is gripped by a user's hand 472, the electronic device 101 may shoot an eye 470 portion that includes the user's iris being within an angle-of-view (FOV) range 411 of the iris camera 410, using the iris camera 410. For instance, the electronic device 101 may extract (510) a pupil from a captured user's eye image 500, and distinguish (520) an iris from the extracted pupil. Also, the electronic device 101 may eliminate (530) an eyebrow or eyelash from the extracted iris and standardize the result iris, thereby generating, for example, a coded (or encoded) reference template 540. To acquire an accurate iris image, the electronic device 101 may output, to a screen, guide information 450 for guiding user's eyes to a previously designated position as well.

According to various example embodiments, the electronic device 101 may perform an iris authentication operation for user authentication. According to an example embodiment, in a state where a lock function has been set, the electronic device 101 may shoot user's eyes using the iris camera 410 and the light source module 420, thereby acquiring an authentication template. For example, the electronic device 101 may extract a pupil from a captured user's eye image, and distinguish an iris from the extracted pupil. Also, the electronic device 101 may eliminate an eyebrow or eyelash from the extracted iris and standardize the result iris, thereby generating a coded authentication template. For instance, the electronic device 101 may compare the authentication template with a stored reference template, to perform an authentication operation.

According to various example embodiments, the electronic device 101 may store, as an additional template (e.g., an additional reference template), an authentication template having performed an authentication operation. According to an example embodiment, the electronic device 101 may store, as an additional template, a template of an iris image having succeeded in authentication. For example, the electronic device 101 may store, as an additional template, an authentication template that has been acquired in an environment different from an environment (e.g., an illumination environment) having registered a reference template. For instance, the electronic device 101 may store, as an additional template, a template of an authentication iris image having a pupil of a size different from a pupil size of a stored reference template.

According to various example embodiments, the electronic device 101 may additionally include an ambient light sensor 430 and a front camera 440. According to an example embodiment, the ambient light sensor 430 may include a proximity sensor for sensing whether a user approaches the electronic device 101, and an illumination sensor for sensing brightness around the electronic device 101. For example, the electronic device 101 may measure a distance between the electronic device 101 and a user (or a user's face or user's eyes) using the ambient light sensor 430. When the measured distance between the electronic device 101 and the user gets out of a designated distance, the electronic device 101 may output guide information guiding user's both eyes to a position where iris shot is possible. According to an example embodiment, the front camera 440 may shoot a user who is located in front of the electronic device 101 and various subjects which are located in front of the electronic device 101. For example, the electronic device 101 may acquire an image of a user's face (e.g., eyes) through the front camera 440. Also, the electronic device 101 may perform an authentication operation using the acquired image of the user's face.

An electronic device according to various example embodiments of the present disclosure may include a housing including a first surface, a display exposed through a first region of the first surface, a light emitting unit comprising light emitting circuitry disposed in a second region of the first surface, an image device comprising image acquiring circuitry disposed in a third region of the first surface, at least one processor disposed within the housing and electrically connected with the display, the light emitting unit and the image device, and a memory disposed within the housing and electrically connected with the at least one processor.

According to an example embodiment, the memory may store instructions that, when executed, by the processor cause the electronic device to store a reference template based on a first iris image which has been recognized using the light emitting unit and the image device, authenticate a second iris image which has been recognized using the light emitting unit and the image device, using the stored reference template, and store a template of the authenticated second iris image, as an additional template. According to an example embodiment, the instructions may enable the processor to cause the electronic device to store a pupil size of the first iris image. For example, the pupil size may include at least one of an actual size of a pupil and/or a rate of a pupil size to an iris size.

According to an example embodiment, the second iris image stored as the additional template may include a pupil of a size different from a pupil size of the first iris image.

According to an example embodiment, the instructions may enable the processor to cause the electronic device to store the reference template and the additional template in a database.

According to an example embodiment, the instructions may enable the processor to cause the electronic device to store the additional template based on a pupil size.

According to an example embodiment, the instructions may enable the processor to, when a storage space for the additional template is deficient, cause the electronic device to delete at least one additional template stored in the database.

According to an example embodiment, the instructions may enable the processor to cause the electronic device to determine whether to store the additional template based on at least one of a difference of a pupil size of the second iris image and a pupil size of an iris image stored as a template, and/or a similarity of the template of the second iris image and the stored template.

According to an example embodiment, the instructions may enable the processor to cause the electronic device to store the coding result of the first iris image, as the reference template.

According to an example embodiment, the instructions may enable the processor to cause the electronic device to store the coding result of the second iris image, as the additional template. According to an example embodiment, the instructions may enable the processor to cause the electronic device to store a similarity between the additional template and the reference template.

An electronic device according to an example embodiment of the present disclosure may include a housing including a first surface, a display exposed through a first region of the first surface, a light emitting unit comprising light emitting circuitry disposed in a second region of the first surface, an image device comprising image acquiring circuitry disposed in a third region of the first surface, at least one processor disposed within the housing and electrically connected with the display, the light emitting unit and the image device, and a memory disposed within the housing and electrically connected with the at least one processor. According to an example embodiment, the memory may store instructions that, when executed by the processor to cause the electronic device to, in a state where a lock function of the electronic device has been released, capture a plurality of first iris images using the light emitting unit and the image device, to store, in the memory, at least a part of each of the plurality of first iris images as reference iris data, to determine a first pupil size associated with the at least part of each of the plurality of first iris images, to store the first pupil size in the memory, in a state where the lock function of the electronic device has been set, to capture at least one second iris image using the light emitting unit and the image device, to compare the second iris image and the reference iris data, to change the electronic device from the state where the lock function has been set to the state where the lock function has been released, based on at least a part of the comparison, to determine a second pupil size within the second iris image, to store, in the memory, the second iris image as additional reference iris data, based on at least a part of the second pupil size, and to store the second pupil size in the memory.

According to an example embodiment, the instructions may enable the processor to cause the electronic device to extract a pupil from the at least part of the plurality of first iris images, to distinguish an iris from the extracted pupil, to eliminate eyelash from the iris, to standardize the iris from which the eyelash has been eliminated, and to encode the standardized iris to store the encoded iris as the reference iris data.

An electronic device according to various example embodiments of the present disclosure may include a housing including a first surface, a display exposed through a first region of the first surface, a light emitting unit comprising light emitting circuitry disposed in a second region of the first surface, an image device comprising image acquiring circuitry disposed in a third region of the first surface, at least one processor disposed within the housing and electrically connected with the display, the light emitting unit and the image device, and a memory disposed within the housing and electrically connected with the at least one processor. According to an example embodiment, the memory may store instructions that when executed by the processor cause the electronic device to capture a plurality of first iris images using the light emitting unit of the electronic device of which a lock function has been released and the image device, in a first ambient brightness environment, to process the plurality of first iris images into a first reference iris data set, to determine a pupil size associated with the plurality of first iris images, to store, in the memory, the pupil size associated with the plurality of first iris images, to capture a second iris image using the light emitting unit of the electronic device of which the lock function has been set and the image device, in a second ambient brightness environment different from the first ambient brightness environment, to process the second iris image into iris data for authentication, to perform authentication using the second iris image and the first reference iris data set, to change the electronic device from the state where the lock function has been set to the state where the lock function has been released, based on at least a part of the authentication, to determine a second size of a pupil within the second iris image, to store, in the memory, the iris data for authentication as at least a part of a second reference iris data set, based on at least a part of the second size, and to store the second size of the pupil in the memory.

Figure 6:
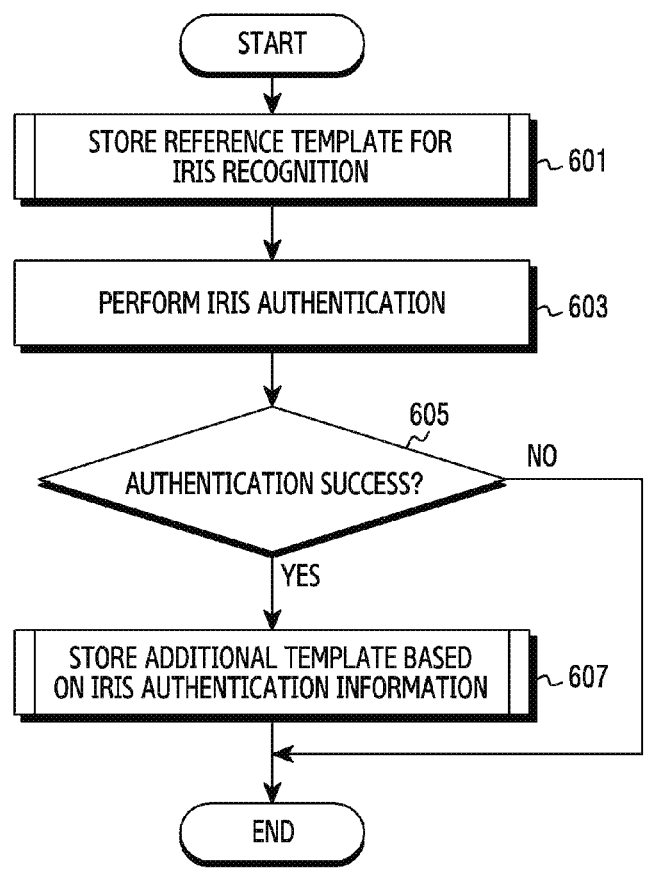
FIG. 6 is a flowchart illustrating an example procedure of performing a user authentication operation in an electronic device according to various example embodiments of the present disclosure.

FIG. 6 is a flowchart illustrating an example procedure of performing a user authentication operation in the electronic device 101 according to various example embodiments of the present disclosure.

Referring to FIG. 6, in operation 601, the electronic device 101 (or the processor 120) may store a reference template (e.g., reference iris template) for iris recognition. The reference template, which is reference information for iris authentication, may be a result of coding an iris image. According to an example embodiment, the electronic device 101 may control a light source module (e.g., the light source module 420) to emit light. Also, the electronic device 101 may control an iris camera (e.g., the iris camera 410) to receive light reflected by at least a part of user's eyes and acquire an iris image. For example, the electronic device 101 may extract a pupil from a captured user's eye image, and distinguish an iris from the extracted pupil. Also, the electronic device 101 may eliminate an eyelash from the extracted iris and standardize the result iris, thereby generating a coded reference template. For instance, in a state (or an unlock state) where a lock function has been released, the electronic device 101 may execute reference template registration, thereby storing at least one reference template.

In operation 603, the electronic device 101 may perform an iris authentication operation. According to an example embodiment, the electronic device 101 may compare a template of an iris image (e.g., authentication iris image) acquired in a state (or lock state) where the lock function has been set and the stored reference template, to determine whether the authentication succeeds or fails. For example, in a state where an authentication screen has been outputted, the electronic device 101 may control a light source module (e.g., the light source module 420) and an iris camera (e.g., the iris camera 410) to acquire an iris image for authentication. For instance, the electronic device 101 may extract a pupil from a captured user's eye image, and distinguish an iris from the extracted pupil. Also, the electronic device 101 may eliminate an eyelash from the extracted iris and standardize the result iris, thereby generating a coded iris template for authentication.

In operation 605, the electronic device 101 may check a result of the iris authentication operation. According to an example embodiment, the electronic device 101 may determine if the template of the iris image for authentication and the reference template have a similarity. For example, when it is determined that the template for authentication has a similarity of a constant level with the reference template, the electronic device 101 may determine that authentication has succeeded. Also, when it is determined that the template for authentication does not have the similarity of the constant level with the reference template, the electronic device 101 may determine that authentication has failed.

When the authentication fails, the electronic device 101 may process an authentication failure. According to an example embodiment, the electronic device 101 may process to keep a lock function. According to another example embodiment, the electronic device 101 may acquire another iris image for authentication as well. For example, the electronic device 101 may display guide information for another iris image acquisition on a screen. For instance, the electronic device 101 may display guide information guiding user's eyes to a position where iris shot is possible.

When the authentication succeeds, as in operation 607, the electronic device 101 may store an additional template based on iris authentication information. According to an example embodiment, the electronic device 101 may store, as the additional template, a template of an iris image having succeeded in authentication. For example, the electronic device 101 may store, as the additional template, a template of an iris image having a pupil of a size different from a pupil size of a stored reference template. According to an example embodiment, the electronic device 101 may release a lock function, in response to the authentication success.

Figure 7:
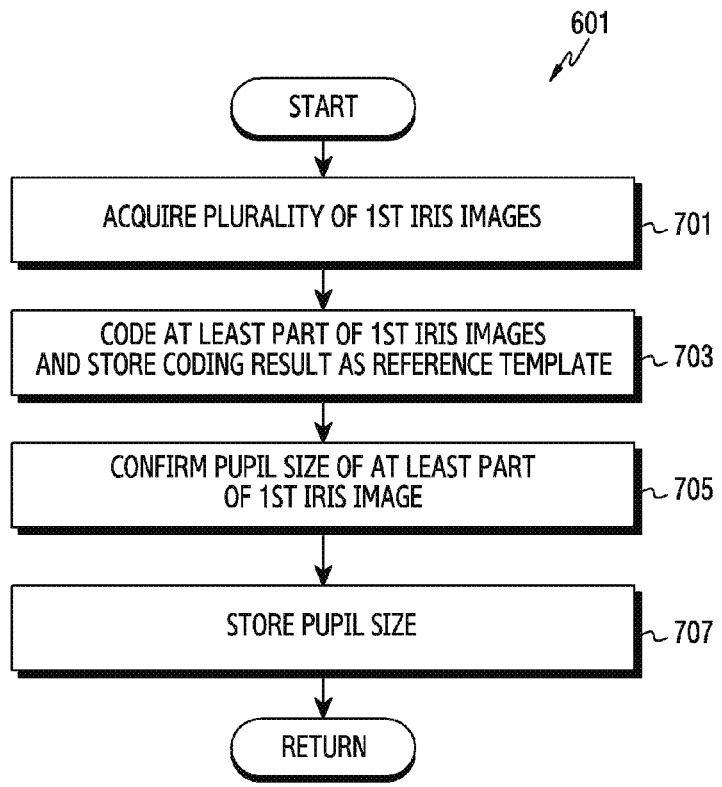
FIG. 7 is a flowchart illustrating an example procedure of storing a reference template in an electronic device according to various example embodiments of the present disclosure.
Figure 8A:
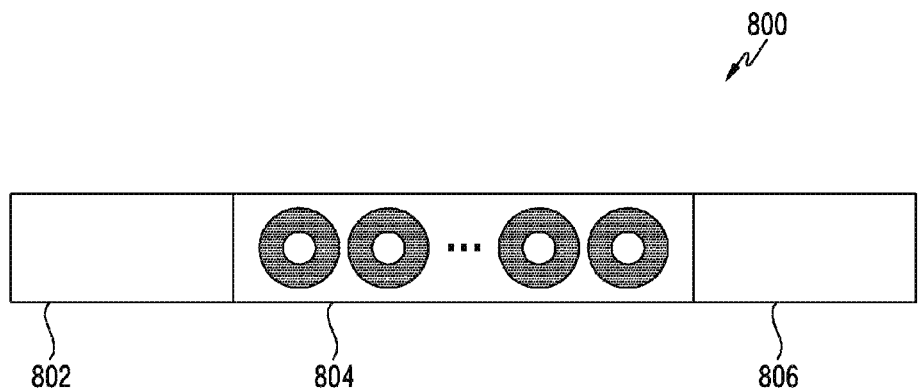
FIG. 8A and FIG. 8B are diagrams illustrating an example reference template storing procedure according to an example embodiment.
Figure 8B:
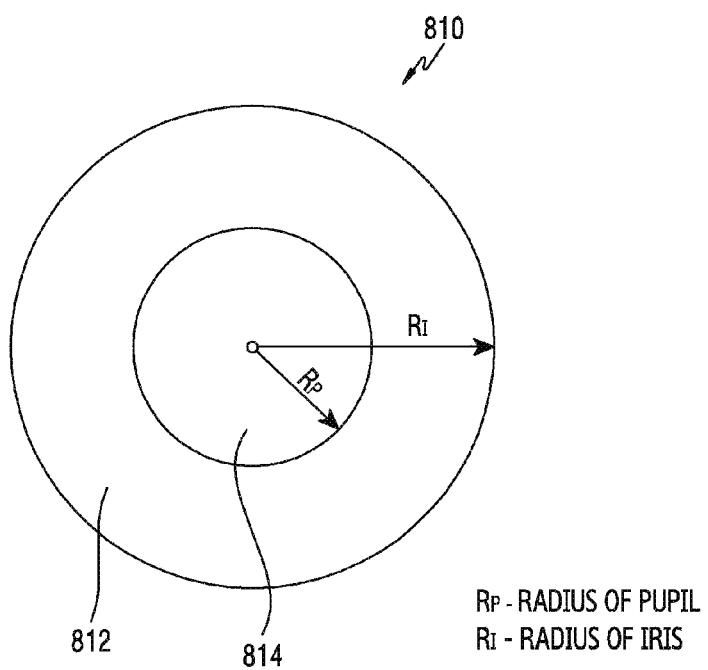

FIG. 7 is a flowchart illustrating an example procedure of storing a reference template in the electronic device 101 according to various example embodiments of the present disclosure. FIG. 8A and FIG. 8B are example diagrams illustrating an example reference template storing procedure. According to an example embodiment, the procedure of storing the reference template may be a detailed operation of operation 601 mentioned in FIG. 6.

Referring to FIG. 7, FIG. 8A and FIG. 8B, in operation 701, the electronic device 101 (or the processor 120) may acquire a plurality of first iris images. According to an example embodiment, the first iris image may be an iris image that will be used as a reference template. For example, the electronic device 101 may display guide information guiding user's both eyes to a position where iris shot is possible. Also, the electronic device 101 may shoot both of the user's eyes corresponding to the guide information, to acquire the first iris image. For instance, the electronic device 101 may shoot by a previously designated count, to acquire a plurality of (e.g., 10) first iris images.

In operation 703, the electronic device 101 may code at least a part of the first iris image and store the coding result as a reference template. According to an example embodiment, the electronic device 101 may register, as the reference template, a template of a first iris image satisfying a condition among the plurality of first iris images. For example, the electronic device 101 may store, as the reference template, a template coding at least one first iris image among a first iris image in which a boundary of an iris region and a pupil region is clear, and/or a first iris image including an iris region of a previously designated range. According to an example embodiment, the electronic device 101 may make the coded reference template into database and store the same. For example, as illustrated in FIG. 8A, the electronic device 101 may manage a database 800 comprised of regions 802 and/or 806 storing coded additional templates and a region 804 storing a coded reference template. For instance, the electronic device 101 may store a reference template in the region 804 storing the coded reference template.

In operation 705, the electronic device 101 may confirm a pupil size of the at least part of the first iris image. According to an example embodiment, the electronic device 101 may confirm the pupil size of the first iris image which has been stored as the reference template. For example, as illustrated in FIG. 8B, the electronic device 101 may confirm a rate of a pupil 814 size (e.g., radius pupil ($R_P$)) to an iris 812 size (e.g., radius iris ($R_I$)).

In operation 707, the electronic device 101 may store the pupil size of the first iris image. According to an example embodiment, the electronic device 101 may store a rate of a pupil size to an iris size, an actual size of a pupil, etc., as the pupil size.

Figure 9:
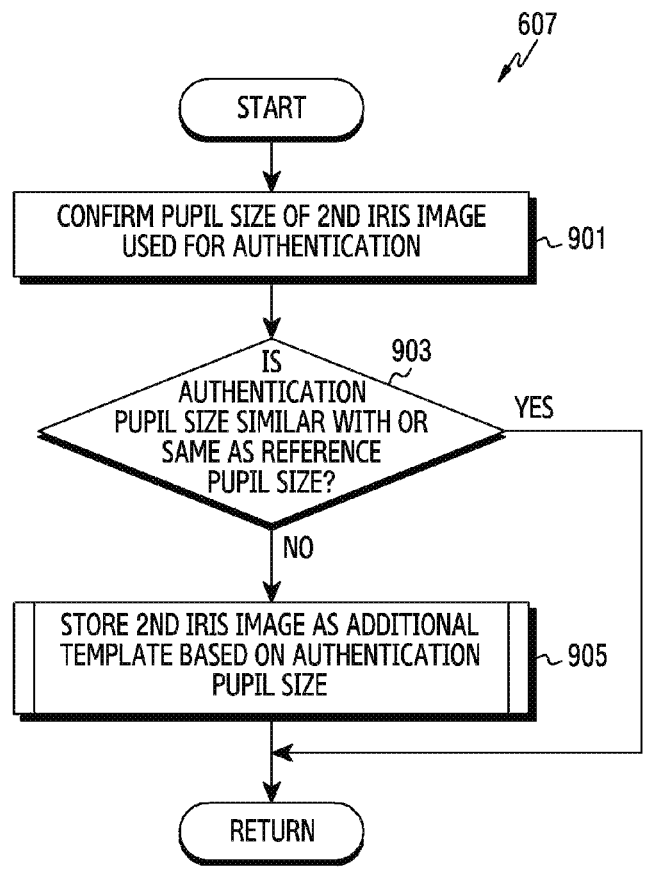
FIG. 9 is a flowchart illustrating an example procedure of storing an additional template in an electronic device according to various example embodiments of the present disclosure.

FIG. 9 is a flowchart illustrating an example procedure of storing an additional template in the electronic device 101 according to various example embodiments of the present disclosure. According to an example embodiment, the procedure of storing the additional template may be a detailed operation of operation 607 mentioned in FIG. 6.

Referring to FIG. 9, if authentication on an authentication iris image succeeds, the electronic device 101 (or the processor 120) may store, as an additional template, a template of the iris image used for authentication. For example, the electronic device 101 may use a reference template and the stored additional template, for user authentication.

In operation 901, the electronic device 101 may confirm a pupil size (e.g., authentication pupil size) of second iris image of an authentication iris image used for authentication. According to an example embodiment, the electronic device 101 may confirm a rate of a pupil size to an iris size. For example, the electronic device 101 may confirm a pupil size of an authentication iris image satisfying a condition. For instance, the condition may include at least one of an authentication iris image having succeeded in authentication, an authentication iris image capable of detecting all of both eyes and determining whether it is the right eye or left eye, and/or an authentication iris image including an iris region of a previously designated range.

In operation 903, the electronic device 101 may determine whether the pupil size of the authentication iris image is similar with or is the same as a pupil size (e.g., a reference pupil size) of an iris image stored as a reference template. According to an example embodiment, when it is determined that the pupil size of the authentication iris image is similar with or is the same as the pupil size of the iris image stored as the reference template, the electronic device 101 may determine that the reference template and the template of the authentication iris image have been acquired under the mutually same or similar environment condition (e.g., illumination condition). Also, when it is determined that the pupil size of the authentication iris image is not similar with or is not the same as the pupil size of the iris image stored as the reference template, the electronic device 101 may determine that the reference template and the template of the authentication iris template have been acquired under mutually different environment conditions. For example, when the pupil size of the authentication iris image is larger than the pupil size of the iris image stored as the reference template, the electronic device 101 may determine that the authentication iris image have been acquired in a situation darker than a situation where the reference template has been acquired.

When the pupil size of the authentication iris image is the same as the pupil size of the iris image stored as the reference template, the electronic device 101 may omit an operation of storing an additional template. According to an example embodiment, the electronic device 101 may determine that an iris region of the authentication iris image is the same as an iris region of the iris image stored as the reference template and thus, omit additional template registration.

When the pupil size of the authentication iris image is not the same as the pupil size of the iris image stored as the reference template, in operation 905, the electronic device 101 may store, as an additional template, at least a part of the authentication iris image. According to an example embodiment, the electronic device 101 may determine that the iris region of the authentication iris image is different from the iris region of the iris image stored as the reference template and thus, store a template of the authentication iris image, as an additional template. For example, the electronic device 101 may use the additional template as a reference template which has been registered under an illumination environment brighter or darker than an environment having registered the reference template. For instance, as illustrated in FIG. 8A, the electronic device 101 may store an additional template in the regions 802 and/or 806 storing the coded additional templates. According to an example embodiment, the electronic device 101 may store an additional template whenever authentication succeeds, to increase the number of additional templates.

Figure 10A:
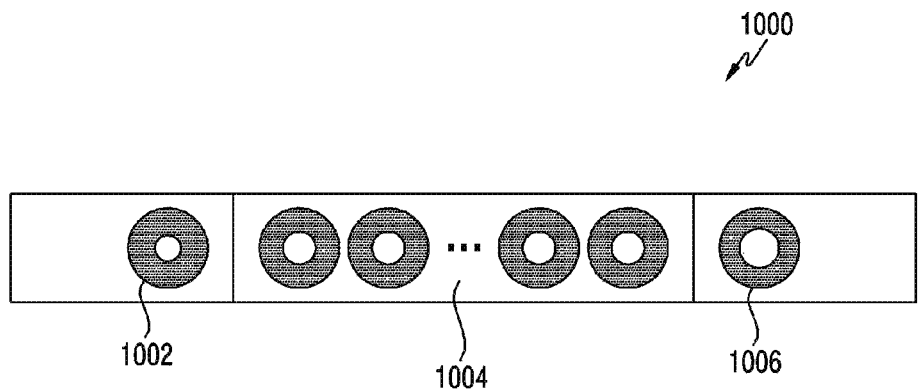
FIG. 10A, 10B and FIG. 10C are diagrams illustrating an example database according to various example embodiments of the present disclosure.
Figure 10B:
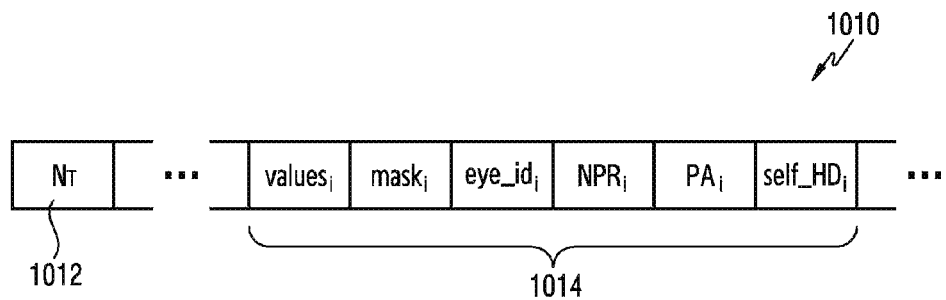
Figure 10C:
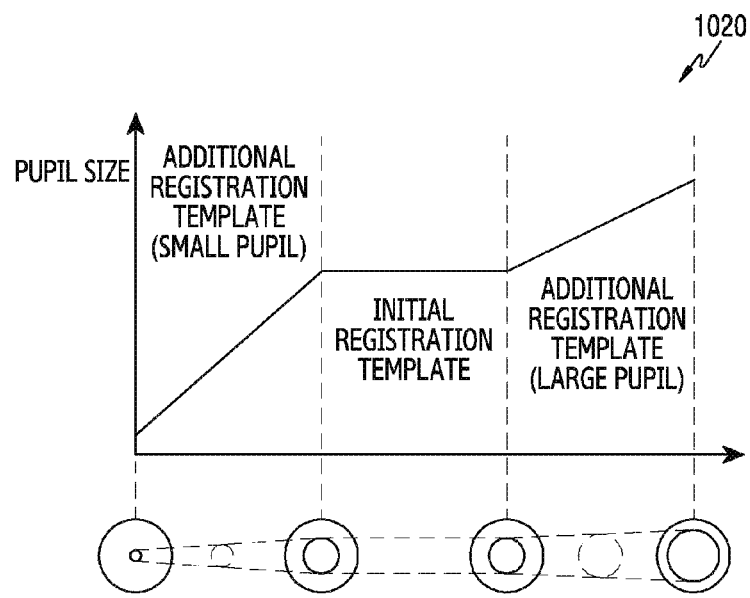

FIG. 10A, 10B and FIG. 10C are example diagrams illustrating an example database according to various example embodiments of the present disclosure.

Referring to FIG. 10A, 10B and FIG. 10C, the electronic device 101 (or the processor 120) according to various example embodiments may database and manage a reference template and additional template which may be used for iris authentication operation.

According to various example embodiments, as illustrated in FIG. 10A, a database 1000 may be comprised of regions 1002 and/or 1006 storing coded additional templates, and a region 1004 storing a coded reference template.

According to an example embodiment, a reference template initially registered to an electronic device for the sake of iris recognition may be stored in the region 1004 storing the coded reference template. For example, the initially registered reference template may include templates of a plurality of iris images forming a left and right pair. For instance, reference templates coding respective iris images (e.g., five left iris images and five right iris images) of a previously designated number corresponding to left and right eyes may be stored. According to an example embodiment, the reference templates stored in the region 1004 storing the coded reference template may be kept in an initial registration state without being deleted or being replaced with an additional template. Also, the reference templates stored in the region 1004 storing the coded reference template are templates acquired in a similar illumination condition, and may have mutually similar pupil sizes.

According to an example embodiment, the regions 1002 and/or 1006 storing the coded additional templates may store, as an additional template, a template of an iris image having succeeded in authentication. For example, the additional template may be a template of an iris image having a pupil of a size which is different from a pupil size of an iris image stored as the reference template among iris images having succeeded in authentication. For instance, a template of an iris image having a pupil of a size smaller than the pupil size of the iris image stored as the reference template may be stored in the first region 1002 (or the second region 1006) with a criterion of the region 1004 storing the reference template. Also, a template of an iris image having a pupil of a size larger than the pupil size of the iris image stored as the reference template may be stored in the second region 1006 (or the first region 1002) with a criterion of the region 1004 storing the reference template.

According to an example embodiment, as illustrated in FIG. 10B, a database 1010 may include a field 1012 indicating the total number of templates (e.g., the number of reference templates and additional templates). Continuously following that, additional templates and reference templates of a previously designated number may be positioned. Also, each additional template (e.g., ith additional template 1014) may include a value (values$_i$) indicating an actual iris image, a value (mask$_i$) indicating a needless region among the iris image, a value (eye_id$_i$) indicating the right or left eye, a value (NPR$_i$) indicating a pupil size rate, a value (PA$_i$) indicating a rate of a valid region (e.g., non-masked region) of the iris image (value), and/or a value (self_HD$_i$) indicating a similarity average (e.g., a self hamming distance (HD$_i$)) with an initially registered template and a corresponding additional template.

According to an example embodiment, storage positions of additional templates stored in a database may be determined based on pupil sizes. For example, as illustrated in FIG. 10C, from a template of an iris image having a small pupil size may be stored (1020) in a database, thereby managing the database ideally for iris recognition. For instance, the additional template and reference template stored in the database may be used as comparison targets of an iris image acquired in a dark illumination environment and an iris image acquired in a bright illumination environment.

Figure 11:
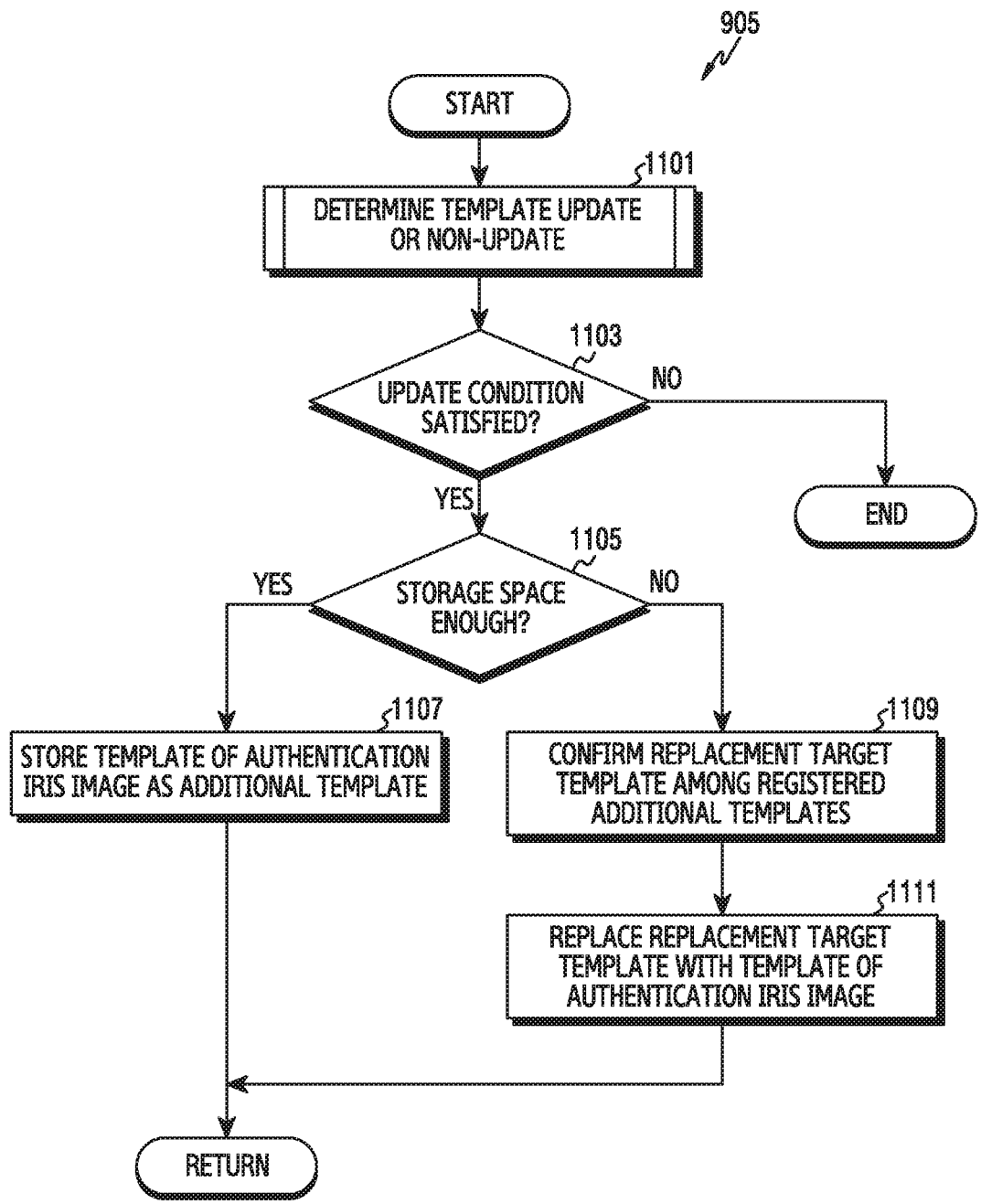
FIG. 11 is a flowchart illustrating an example procedure of storing an additional template in an electronic device according to various example embodiments of the present disclosure.
Figure 12A:
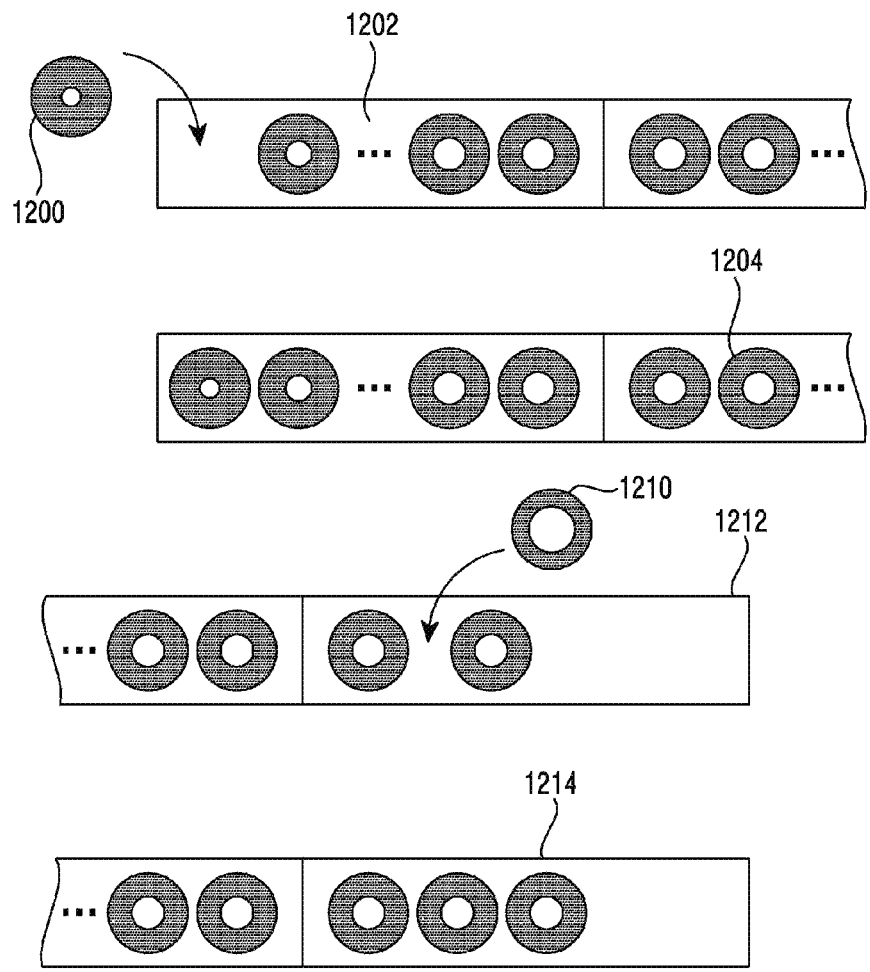
FIG. 12A and FIG. 12B are diagrams illustrating an example additional template storing operation according to various example embodiments of the present disclosure.
Figure 12B:
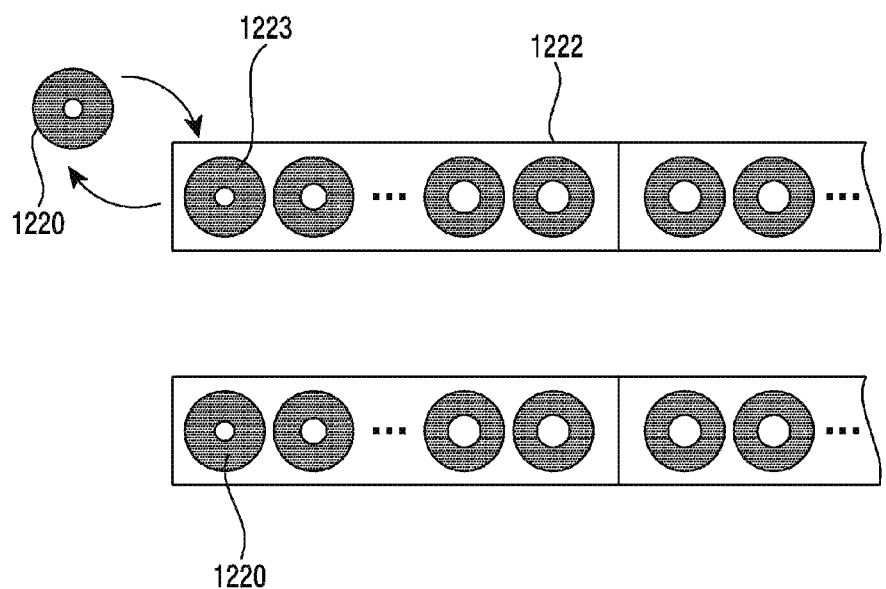

FIG. 11 is a flowchart illustrating an example procedure of storing an additional template in the electronic device 101 according to various example embodiments of the present disclosure. FIG. 12A and FIG. 12B are example diagrams illustrating an example additional template storing operation according to various example embodiments of the present disclosure. According to an example embodiment, the procedure of storing the additional template may be a detailed operation of operation 905 mentioned in FIG. 9.

Referring to FIG. 11, FIG. 12A and FIG. 12B, if authentication on an authentication iris image (e.g., a second iris image) succeeds, the electronic device 101 (or the processor 120) may determine whether the authentication iris image (e.g., the second iris image) used for the authentication satisfies a template storage condition, to store a template of the authentication iris image as an additional template.

In operation 1101, the electronic device 101 may determine template update or non-update of the authentication iris image. According to an example embodiment, the electronic device 101 may determine whether to store a template of the authentication iris image, as an additional template. For instance, the electronic device 101 may determine the update or non-update based on a difference of pupil sizes of the authentication iris image and an iris image stored as a template, and/or a similarity between the template of the authentication iris image and the stored template.

In operation 1103, the electronic device 101 may check the determination result on the template update or non-update. According to an example embodiment, the electronic device 101 may determine a target template having a pupil of a size similar with a pupil size of the authentication iris image. Also, when satisfying at least one of a condition that a difference of the pupil size of the authentication iris image and the pupil size of the target template is equal to or is greater than a threshold value and/or a condition that a template of the authentication iris image is more similar with the reference template than the target template, the electronic device 101 may determine that it has satisfied a template update condition of the authentication iris image.

When not satisfying the template update condition, the electronic device 101 may end the process and omit the operation of storing the additional template.

When satisfying the template update condition, in operation 1105, the electronic device 101 may determine whether a marginal space of a database for storing an additional template exists. According to an example embodiment, the electronic device 101 may determine whether a previously designated number of additional templates have been stored in a region of a database storing a coded additional template.

When the marginal space for storing the additional template exists, in operation 1107, the electronic device 101 may store the template of the authentication iris image as an additional template. According to an example embodiment, the electronic device 101 may determine a storage position of the template based on the pupil size of the authentication iris image. For example, as illustrated in FIG. 12A, when a pupil size of an authentication iris image 1200 is smaller than the smallest pupil size of a stored template 1202 (e.g., a reference template and an additional template), the electronic device 101 may store (1204) the authentication iris image in a space ahead of the stored template 1202. Also, when a pupil size of an authentication iris image is larger than the largest pupil size of a stored template, the electronic device 101 may store the authentication iris image in a space behind a previously stored template. For another example, when a pupil size of an authentication iris image 1210 corresponds to a middle of a pupil size of a stored template 1212, the electronic device 101 may confirm a template having a pupil size similar with the pupil size of the authentication iris image 1210 among the stored template 1212, and store (1214) the template of the authentication iris image 1210 in a space behind (or ahead of) the confirmed template.

When the marginal space for storing the additional template is deficient, in operation 1109, the electronic device 101 may confirm at least one replacement target template among registered additional templates. According to an example embodiment, as illustrated in FIG. 12B, the electronic device 101 may determine, as a replacement target template, a template 1223 having a pupil size similar with a pupil size of an authentication iris image 1220, among templates 1222 stored in a database.

In operation 1111, the electronic device 101 may delete the replacement target template stored in the database and store (1220) the template of the authentication iris image.

Figure 13:
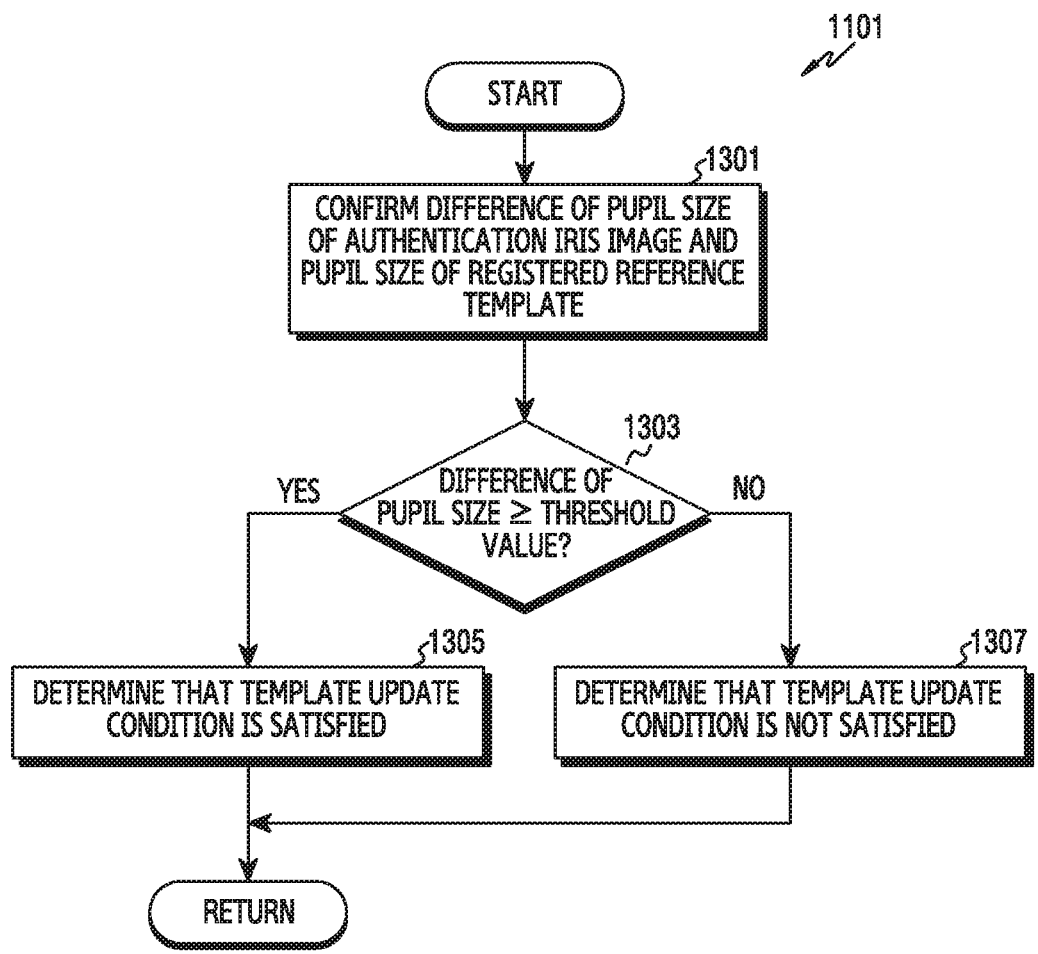
FIG. 13 is a flowchart illustrating an example procedure of determining whether to update an additional template in an electronic device according to various example embodiments of the present disclosure.

FIG. 13 is a flowchart illustrating an example procedure of determining template update or non-update in the electronic device 101 according to various example embodiments of the present disclosure. According to an example embodiment, the procedure of determining the template update or non-update may be a detailed operation of operation 1101 mentioned in FIG. 11.

Referring to FIG. 13, in operation 1301, the electronic device 101 (or the processor 120) may check a difference of a pupil size of an authentication iris image (e.g., a second iris image) and a pupil size of an iris image of a stored reference template. According to an example embodiment, the electronic device 101 may determine the difference of the pupil sizes through Equation 1 and Equation 2 below.

$$NPR_{AVG}=(NPR_{i-1}+NPR_{i+1})/2 \qquad \text{[Equation 1]}$$

In Equation 1, $NPR_{AVG}$ refers an average pupil size of a reference template, $NPR_i$ refers a pupil size of an iris image of a reference template similar with a pupil size of an authentication iris image, $NPR_{i+1}$ refers a pupil size of an iris image of a reference template larger one level than the pupil size of the authentication iris image, and $NPR_{i-1}$ refers a pupil size of an iris image of a reference template smaller one level than the pupil size of the authentication iris image.

$$D=|NPR_i-NPR_{AVG}|-|NPR_{inc}-NPR_{AVG}| \qquad \text{[Equation 2]}$$

In Equation 2, D refers a difference of a pupil size, the $NPR_i$ refers a pupil size of an iris image of a reference template similar with a pupil size of an authentication iris image, $NPR_{inc}$ refers the pupil size of the authentication iris image, and $NPR_{AVG}$ refers an average pupil size of the reference template.

In operation 1303, the electronic device 101 may compare the difference of the pupil size with a previously designated threshold value.

When the difference of the pupil size of the authentication iris image and the pupil size of the iris image of the reference template is less than the previously designated threshold value, in operation 1307, the electronic device 101 may determine that it does not satisfy a template update condition of the authentication iris image. For example, the electronic device 101 may determine that a template similar with the template of the authentication iris image has been already stored. For instance, the electronic device 101 may omit an operation of registering the template of the authentication iris image as an additional template.

When the difference of the pupil size of the authentication iris image and the pupil size of the iris image of the reference template is equal to or is greater than the previously designated threshold value, in operation 1305, the electronic device 101 may determine that it satisfies the template update condition of the authentication iris image.

Figure 14:
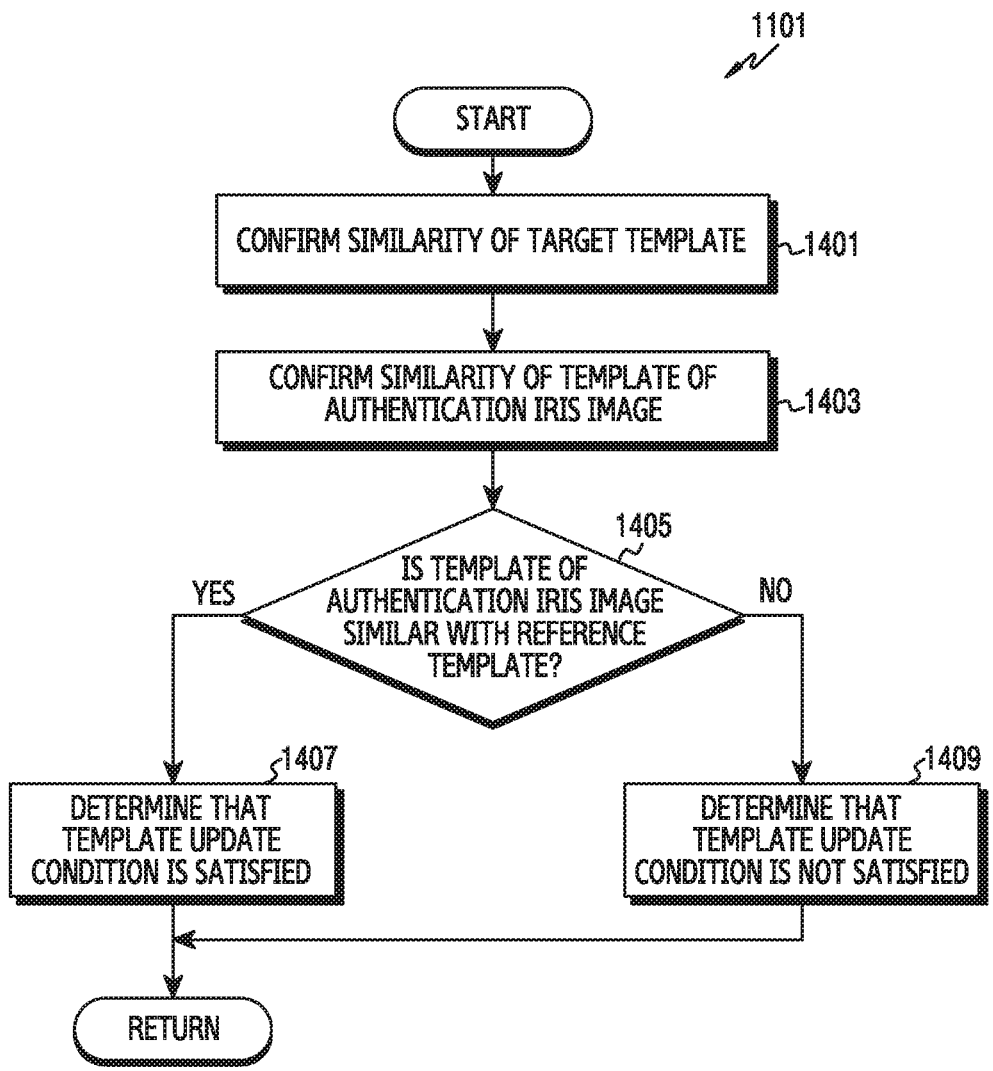
FIG. 14 is a flowchart illustrating an example procedure of determining whether to update an additional template in an electronic device according to various example embodiments of the present disclosure.

FIG. 14 is a flowchart illustrating an example procedure of determining whether to update an additional template in the electronic device 101 according to various example embodiments of the present disclosure. According to an example embodiment, the procedure of determining the additional template update or non-update may be a detailed operation of operation 1101 mentioned in FIG. 11.

Referring to FIG. 14, in operation 1401, the electronic device 101 (or the processor 120) may confirm a similarity of a target template. According to an example embodiment, the electronic device 101 may confirm a similarity between a stored reference template and the target template. For example, the electronic device 101 may confirm a similarity of a target template having a pupil size similar with a pupil size of an authentication iris image, among stored templates. For instance, the electronic device 101 may confirm a similarity value of a target template stored in a database.

In operation 1403, the electronic device 101 may confirm a similarity of a template of an authentication iris image (e.g., a second iris image). According to an example embodiment, the electronic device 101 may confirm a similarity between the stored reference template and the template of the authentication iris image. For example, by using a hamming distance algorithm, the electronic device 101 may confirm the similarity between the stored reference template and the template of the authentication iris image.

In operation 1405, the electronic device 101 may compare the similarity of the template of the authentication iris image and the similarity of the target template. According to an example embodiment, the electronic device 101 may determine whether the template of the authentication iris image is similar with the reference template or whether the target template is similar with the reference template.

When it is determined that the target template is not similar with the reference template, in operation 1409, the electronic device 101 may determine that it does not satisfy a template update condition of the authentication iris image.

When it is determined that the template of the authentication iris image is similar with the reference template, in operation 1407, the electronic device 101 may determine that it has satisfied the template update condition of the authentication iris image.

An electronic device according to various example embodiments of the present disclosure and an operating method thereof may secure an authentication template corresponding to various illumination environments by adding a template of an iris image having succeeded in authentication as a template used for authentication. It may improve an iris recognition rate of the electronic device using the added template for an authentication operation.

An operating method of an electronic device according to various example embodiments of the present disclosure may include storing a reference template based on a first iris image, authenticating a second iris image using the stored reference template, and storing a template of the authenticated second iris image, as an additional template.

According to an example embodiment, storing the reference template may include storing a pupil size of the first iris image. For example, the pupil size may include at least one of an actual size of a pupil and/or a rate of a pupil size to an iris size.

According to an example embodiment, the second iris image stored as the additional template may include a pupil of a size different from a pupil size of the first iris image.

According to an example embodiment, the reference template and the additional template may be stored in a database.

According to an example embodiment, the additional template may be stored based on a pupil size.

According to an example embodiment, when a storage space for the additional template is deficient, at least one additional template stored in the database may be deleted.

According to an example embodiment, storing the template of the authenticated second iris image as the additional template may include determining whether to store the additional template based on at least one of a difference of a pupil size of the second iris image and a pupil size of an iris image stored as a template, and/or a similarity of the template of the second iris image and the stored template.

According to an example embodiment, storing the reference template may include storing the coding result of the first iris image.

According to an example embodiment, storing the additional template may include storing the coding result of the second iris image.

According to an example embodiment, storing the additional template may include storing a similarity between the additional template and the reference template.

The various example embodiments disclosed in the present disclosure are provided for explaining and understanding of the technology content disclosed, and does not limit the scope of various example embodiments of the present disclosure. Accordingly, the scope of various example embodiments of the present disclosure should be understood as including all modifications or various other example embodiments that are based on the technological spirit of the various example embodiments of the present disclosure.

What is claimed is:

1. An electronic device comprising:
a housing comprising a first surface;
a display viewable through a first region of the first surface;
a light emitting unit comprising light emitting circuitry disposed in a second region of the first surface;
an image device comprising image acquiring circuitry disposed in a third region of the first surface;
at least one processor disposed within the housing and electrically connected with the display, the light emitting unit, and the image device; and
a memory disposed within the housing and electrically connected with the at least one processor,
wherein the memory stores instructions that, when executed by the processor, cause to the electronic device to:
acquire a first iris image from a user using the light emitting unit and the image device,
generate a first template based on the first iris image, the first template comprising a pupil size of the first iris image,
store, as a reference template for the user in a template database, the first template,
acquire a second iris image from the user using the light emitting unit and the image device,
generate a second template based on the second iris image, the second template comprising a pupil size of the second iris image,
authenticate the second template by comparing the second template with the reference template, and
store the second template as an additional reference template for the user in the template database, when the pupil size of the second template succeeded in the authentication does not correspond to a pupil size of at least one reference template in the template database.

2. The electronic device of claim 1, wherein the pupil size of the first iris image comprises at least one of: an actual pupil size of the first iris image stored as the reference template and a rate of a pupil size to an iris size.

3. The electronic device of claim 1, wherein the second iris image stored as the additional template comprises a pupil having a size different from a pupil size of the first iris image.

4. The electronic device of claim 1, wherein the instructions when executed by the at least one processor cause the electronic device to store, based on a pupil size, the additional template.

5. The electronic device of claim 1, wherein the instructions when executed by the at least one processor cause the electronic device to, when a storage space for the additional template is deficient, delete at least one additional template stored in the database.

6. The electronic device of claim 1, wherein the instructions when executed by the at least one processor cause the electronic device to determine whether to store the additional template based on at least one of: a difference of a pupil size of the second iris image and a pupil size of an iris image which has been stored as the reference template or the additional template, and a similarity of the template of the second iris image and the stored reference template or the stored additional template.

7. The electronic device of claim 1, wherein the instructions when executed by the at least one processor cause the electronic device to store a coding result of the first iris image as the reference template.

8. The electronic device of claim 1, wherein the instructions when executed by the at least one processor cause the electronic device to store a coding result of the second iris image as the additional template.

9. The electronic device of claim 1, wherein the instructions which when executed by the at least one processor cause the electronic device to store a similarity between the additional template and the reference template.

10. A method of operating an electronic device, the method comprising:
acquiring a first iris image from a user using a light emitting unit comprising a light source of the electronic device and an image device of the electronic device;
generating a first template based on the first iris image, the first template comprising a pupil size of the first iris image;
storing, as a reference template for the user in a template database, the first template;
acquiring second iris image from the user using the light emitting unit and the image device; and
generating a second template based on the second iris image, the second template comprising a pupil size of the second iris image;
authenticating the second template by comparing the second template with the reference template; and
storing the second template as an additional reference template for the user in the template database when the pupil size of the second template succeeded in the authentication does not corresponds to a pupil size of at least one reference template in the template database.

11. The method of claim 10, wherein the pupil size of the first iris image comprises at least one of: an actual size of a pupil and a rate of a pupil size to an iris size.

12. The method of claim 10, wherein the second iris image stored as the additional template comprises a pupil having a size different from a pupil size of the first iris image.

13. The method of claim 10, wherein the additional template is stored based on a pupil size.

14. The method of claim 10, wherein at least one additional template stored in the database is deleted when a storage space for the additional template is deficient.

15. The method of claim 10, wherein storing the template of the second iris image in succeeded in authentication comprises determining whether to store the additional template based on at least one of: a difference of a pupil size of the second iris image and a pupil size of an iris image stored as a template, and a similarity of the template of the second iris image and the stored template.

16. The method of claim 10, wherein storing the reference template comprises storing a coding result of the first iris image.

17. The method of claim 10, wherein storing the additional template comprises storing a coding result of the second iris image.

18. The method of claim 10, wherein storing the additional template comprises storing a similarity between the additional template and the reference template.

* * * * *